(12) United States Patent
Arasachetty et al.

(10) Patent No.: US 11,334,534 B2
(45) Date of Patent: May 17, 2022

(54) SYSTEM AND METHOD FOR PROVIDING A CORRELATED CONTENT ORGANIZING TECHNIQUE IN AN ENTERPRISE CONTENT MANAGEMENT SYSTEM

(71) Applicant: ORACLE INTERNATIONAL CORPORATION, Redwood Shores, CA (US)

(72) Inventors: Bhageerath Arasachetty, Bangalore (IN); Praveen Kumar Jayaram, Bangalore (IN); Shyam Babu Prasad, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 74 days.

(21) Appl. No.: 16/586,380

(22) Filed: Sep. 27, 2019

(65) Prior Publication Data

US 2021/0097031 A1  Apr. 1, 2021

(51) Int. Cl.
*G06F 16/13* (2019.01)
*G06F 16/188* (2019.01)
*G06F 7/14* (2006.01)

(52) U.S. Cl.
CPC .............. *G06F 16/188* (2019.01); *G06F 7/14* (2013.01); *G06F 16/13* (2019.01)

(58) Field of Classification Search
CPC ........... G06F 16/188; G06F 16/13; G06F 7/14
See application file for complete search history.

(56) References Cited

U.S. PATENT DOCUMENTS

| 7,076,494 | B1* | 7/2006 | Baer .................... G06F 16/95 |
| 7,346,844 | B1* | 3/2008 | Baer .................... G06Q 30/0603 |
| | | | 715/708 |
| 7,401,097 | B1* | 7/2008 | Baer .................... G06F 40/10 |
| 7,660,902 | B2* | 2/2010 | Graham .............. H04L 63/0281 |
| | | | 709/229 |
| 2002/0103818 | A1* | 8/2002 | Amberden ............ G06F 16/954 |

(Continued)

OTHER PUBLICATIONS

United States Patent and Trademark Office, Office Action dated Oct. 4, 2021 for U.S. Appl. No. 16/746,326, 10 pages.

(Continued)

*Primary Examiner* — Eliyah S. Harper
(74) *Attorney, Agent, or Firm* — Tucker Ellis LLP

(57) ABSTRACT

Described herein are systems and methods for providing a correlated content organizing technique in a content management system. In accordance with an embodiment, the systems and methods discussed herein provide the ability to dynamically merge multiple correlated (where dependency is derived from each content item's metadata set) content items into one single content item/document and/or organize them into a single folio for ease of future access. For example, when a user performs check-in of a new content item into an ECM application, a smart content organizer agent can find correlated and/or dependent content items and attempt to merge both content items into one single content item. This can enable all the correlated content items to exist as one single document/item in an ECM application, with the benefit of providing increased ease of accessing correlated and/or dependent content item(s) in a shorter amount time.

20 Claims, 7 Drawing Sheets

(56) References Cited

U.S. PATENT DOCUMENTS

| | | | |
|---|---|---|---|
| 2007/0003914 A1* | 1/2007 | Yang | G06F 9/453 |
| | | | 434/236 |
| 2008/0233930 A1* | 9/2008 | Wurster | H04L 51/066 |
| | | | 455/414.3 |
| 2009/0077141 A1* | 3/2009 | Hady | G06F 16/1847 |
| 2012/0203708 A1* | 8/2012 | Psota | G06Q 30/06 |
| | | | 705/347 |
| 2013/0159251 A1* | 6/2013 | Skrenta | G06F 16/2282 |
| | | | 707/612 |
| 2013/0332429 A1 | 12/2013 | Arasachetty | |
| 2015/0234836 A1 | 8/2015 | Arasachetty | |
| 2017/0147931 A1* | 5/2017 | Desai | H04L 41/0893 |
| 2017/0357551 A1* | 12/2017 | Zacks | G06F 16/128 |
| 2018/0336222 A1* | 11/2018 | Bourgeois | G06Q 10/107 |
| 2019/0045002 A1 | 2/2019 | Arasachetty | |
| 2019/0102390 A1* | 4/2019 | Antunes | G06F 40/295 |
| 2019/0108225 A1 | 4/2019 | Jayaram | |
| 2019/0163459 A1* | 5/2019 | Sreenivasa | G06F 9/547 |
| 2019/0163469 A1* | 5/2019 | Sreenivasa | H04L 63/0281 |
| 2019/0220550 A1 | 7/2019 | Arasachetty | |
| 2019/0325062 A1 | 10/2019 | Rogulenko | |
| 2020/0004853 A1 | 1/2020 | Prasad | |
| 2020/0183607 A1 | 6/2020 | Prasad | |
| 2020/0356528 A1 | 11/2020 | Prasad | |
| 2021/0097021 A1 | 4/2021 | Kadlabalu | |
| 2021/0225455 A1* | 7/2021 | Chowdhury | G16B 5/20 |

OTHER PUBLICATIONS

United States Patent and Trademark Office, Notice of Allowance and Fee(s) Due dated Feb. 9, 2022 for U.S. Appl. No. 16/746,326, 10 pages.

\* cited by examiner

SYSTEM AND METHOD FOR PROVIDING A CORRELATED CONTENT ORGANIZING TECHNIQUE IN AN ENTERPRISE CONTENT MANAGEMENT SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing a correlated content organizing technique in a content management system, such as an Enterprise Content Management (ECM) system.

BACKGROUND

In general, content management systems (variously through this specification, the terms "content management system", "enterprise content management system", "ECM", "ECM system", and "ECM application" are used interchangeably) consists of a repository to store content items. The number of content items grows with the age of the system. One of the more frequently performed operations by users is to find the existing content items in an ECM system. The execution of such search operations becomes more and more complicated and time consuming as the number of content items grow.

However, in general, there are no mechanisms in ECM to merge multiple correlated content items into a single content item or even to automatically organize correlated content items into virtual structures (e.g., folios based on smart metadata tagging). Because of this, the searches performed on such systems generally need to search for each individual content item before referencing them, which is time and resource intensive

SUMMARY

Described herein are systems and methods for providing a correlated content organizing technique in a content management system.

In accordance with an embodiment, the systems and methods discussed herein provide the ability to dynamically merge multiple correlated (where dependency is derived from each content item's metadata set) content items into one single content item/document and/or organize them into a single folio for ease of future access. For example, when a user performs check-in of a new content item into an ECM application, a smart content organizer agent can find correlated and/or dependent content items and attempt to merge both content items into one single content item. This can enable all the correlated content items to exist as one single document/item in an ECM application, with the benefit of providing increased ease of accessing correlated and/or dependent content item(s) in a shorter amount of time.

In accordance with an embodiment, the ECM system can also be configured to organize the correlated and/or dependent content items into one or more folios to enable the correlated content items to exist within one single virtual structure in an ECM application, with the result of improving the ease of access to correlated and/or dependent content item(s) in a shorter amount of time.

In accordance with an embodiment, in addition to providing capabilities for newly created and growing ECM systems, the systems and methods provided herein also can be used in existing ECM systems. In such systems, there can be millions (or more) of content items already uploaded. The systems and methods described herein can provide for a content merge detection operation and merge correlated and/or dependent content items into a smaller amount of items/documents (e.g., one file or document). Additionally, the systems and methods can optionally provide for an agent to organize all correlated and/or dependent content items into a single folio structure.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

In accordance with an embodiment, content management systems enable content to be created, uploaded, accessed, and modified by a plurality of users. For example, a content item such as a document can be created and uploaded by one user, and subsequently accessed and modified by other users. Additionally, a single document can be accessed (e.g., viewed) concurrently by multiple users. Content management systems can be useful for enterprises in which, for example, several individuals collaborate on a project by accessing the same document or set of documents.

Figure 1:
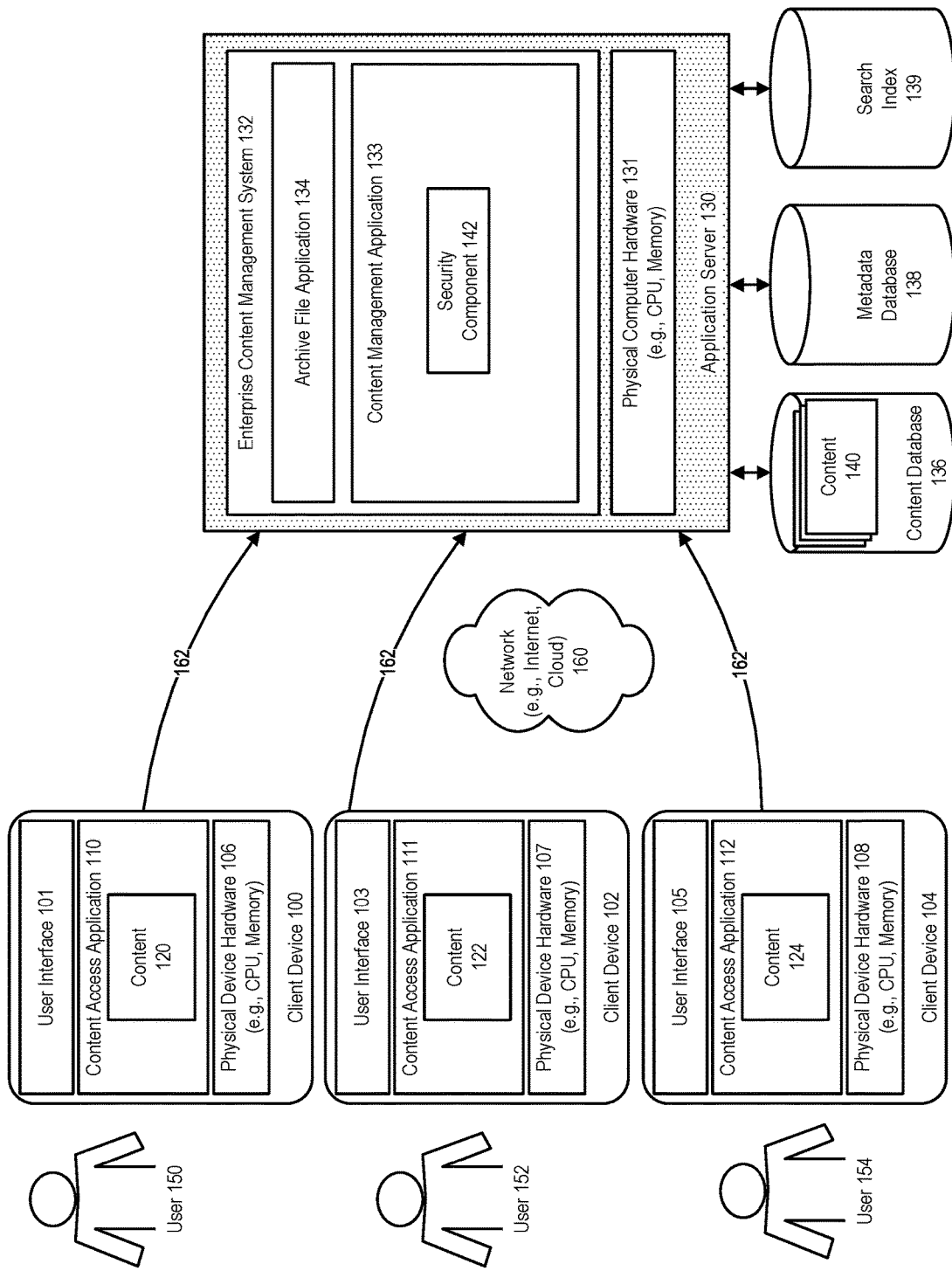
FIG. 1 illustrates a system for providing a correlated content organizing technique in a content management system, in accordance with an embodiment.

FIG. 1 illustrates a system for providing a correlated content organizing technique in a content management system, in accordance with an embodiment.

As illustrated in FIG. 1, in accordance with an embodiment, for each of a plurality of client devices 100, 102, and 104 having a user interface 101, 103, 105 and physical device hardware 106, 107, 108 (e.g., CPU, memory), the client device can be provided with a content access application 110, 111, 112 for execution thereon.

In accordance with an embodiment, the client device can communicate 162 with an application server 130 that includes a physical computer hardware 131 (e.g. CPU, memory) and an enterprise content management system 132.

In accordance with an embodiment, the content access application at the client device can communicate with the enterprise content management system via a network 160 (e.g., the Internet, or a cloud environment). The content access application can be configured to enable a user 150, 152, 154 to view, upload, modify, delete, or otherwise access content such as content items 120, 122, 124 at each client device. For example, new content can be added or uploaded to the enterprise content management system by a user interacting with the content access application on an associated client device. The content can be transmitted to the enterprise content management system for storage.

In accordance with an embodiment, the enterprise content management system can be or include a platform for consolidating content that can be managed by a plurality of users of an enterprise. In accordance with an embodiment, the enterprise content management system can be configured to communicate with a content database 136 for storing content (or content items) 140, and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles.

In accordance with an embodiment, the enterprise content management system can be configured to associate metadata with the content. Metadata can include information about an item of content, such as its title, author, release date, historical data such as who has accessed the item and when, a location where the content is stored, and the like.

In accordance with an embodiment, the metadata can be stored in a metadata database 138. In accordance with an embodiment, the enterprise content management system can be configured to communicate with the metadata database to access metadata stored therein, and to store metadata generated by the system in the metadata database.

In accordance with an embodiment, the enterprise content management system can also be configured to communicate with a search index 139. The search index can be configured to provide indexing and searching of content and data stored in the content database and the metadata database. In accordance with an embodiment, the search index can be a relational database management system (RDBMS) or a search tool such as Oracle Secure Enterprise Search (Oracle SES).

In accordance with an embodiment, content stored within the content database can be checked out for modification by a user at the user's client device, and checked back in to the enterprise content management system.

In accordance with an embodiment, a checked out document can be locked while checked out to a particular user, to prevent other users from modifying the checked out document. However, the system can be configured to permit viewing of the document by other users while it is checked out. In accordance with an embodiment, new versions of content can be created and stored in the content database of the enterprise content management system.

In accordance with an embodiment, the enterprise content management system can further include a content management application 133 including a security component 142. The security component can include or store a security data including user permissions and privileges with respect to particular items of content and/or particular actions. For example, the security data can indicate that certain users are permitted to access and/or modify certain documents. As another example, the security data can indicate that only certain users are permitted to create links between content items, to modify certain content items, or to delete content items.

Providing a Correlated Content Organizing Technique

Figure 2:
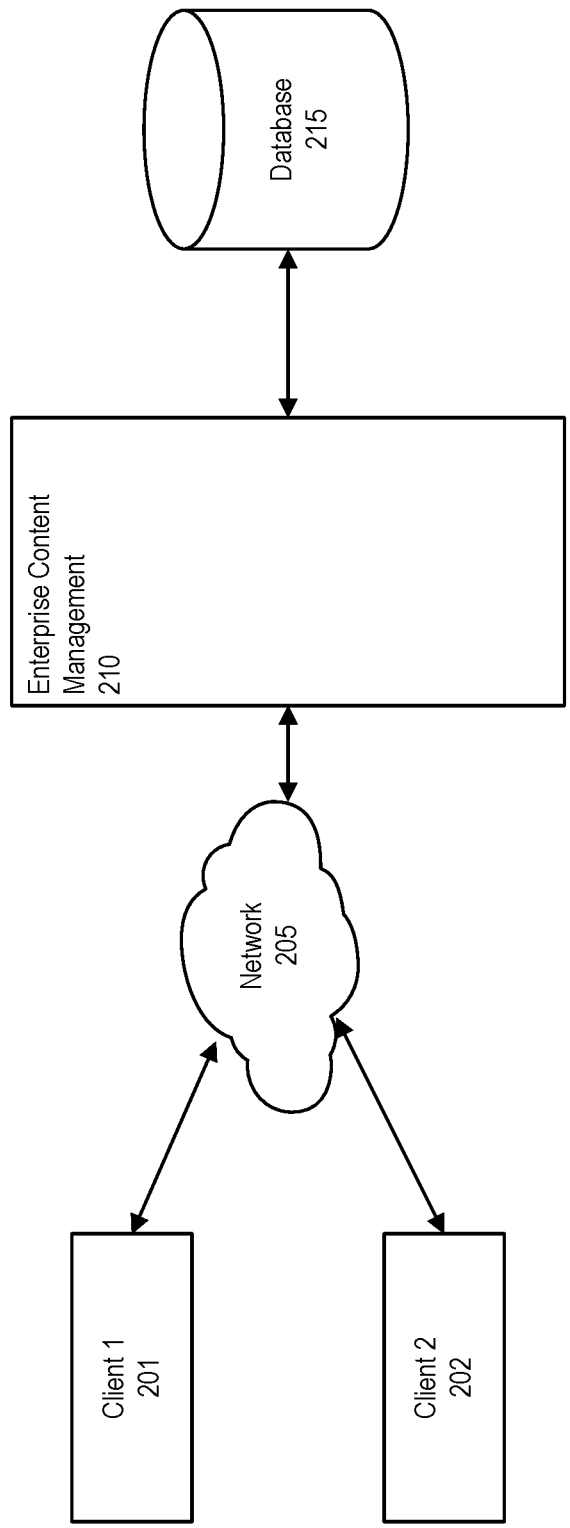
FIG. 2 illustrates a system for providing a correlated content organizing technique in a content management system, in accordance with an embodiment.

FIG. 2 illustrates a system for providing a correlated content organizing technique in a content management system, in accordance with an embodiment.

In accordance with an embodiment, in general, ECM systems 210 comprise a repository (e.g., database 215) to store content items. Such content items can be viewed, accessed, modified, updated, checked out or checked in depending upon a request received from a client (e.g., client 1 201 or client 2 202), via a network 205. The number of content items generally grows with the age of the ECM. A frequently performed operations by users is to search existing content to find desired/queried items in an ECM system and the execution of search operation becomes more and more complicated and time consuming as the number of content items grow.

In accordance with an embodiment, ECMs system having very large numbers of content items generally have performance impact during search operations. The systems and methods described herein can improve such performance by reducing the number of content items in the ECM system by merging content. This can improve search performance as searching will be on smaller datasets. In addition, searches can be performed on folios rather than on/for multiple content items.

In accordance with an embodiment, the presently disclosed systems and methods provide a mechanism for users of an ECM to: a) perform merge of checked-in content item with the available correlated and/or dependent content item in the ECM application, based on configured metadata rules; b) perform grouping of correlated and/or dependent content items into virtual structure within the ECM system (e.g., folios); and c) run content merge detection operations and list out the possible merge-able content items and perform merge operation upon receipt of request, or automatically, or via scheduled job.

Automatic Merge of Uploaded Content

In accordance with an embodiment, each content item in an ECM system/application can have be associated with uniquely identifiable metadata. There can be more than one content item in an ECM application which could be providing information/case study on a particular subject. As the number of content items grow, the time taken to find all the relevant content items pertaining to a subject of interest becomes a time consuming task and on most occasions it would be more meaningful to reference/present these content items as one single content item in an ECM application.

In accordance with an embodiment, as an example, consider a medical report of a patient maintained by a hospital. The patient's record could contain information regarding visits to multiple laboratories to get different kinds of medical examinations done pre-surgery, or even in emergency. A surgeon who is about to perform surgery on such a patient would benefit from being able to refer all the laboratory reports of the patient to study the condition prior to performing the surgery. And on most occasions the decisions must be made in a very short span of time. During such circumstances, even though the laboratory reports are made available online, it would be a tedious and problematic task for the surgeon to search for each of the reports from different laboratories, download and refer them in a quick span of time.

In accordance with an embodiment, the systems and methods described herein can identify the content items (laboratory reports) being newly uploaded to the ECM application belonging to particular subject (patient) and perform auto-merge of such content items (multiple laboratory reports) into one single content item (laboratory report) based upon tagged metadata. This can then allow the user (surgeon) to look for a single content item and, optionally, download the same for reference, thus making the job of finding the content item (which is a collection of all the co-related information on a subject) very easy and faster than if the files were separate. The systems and methods can merge only the co-related content items (laboratory reports) into one single content item, while not merging/mixing other content items corresponding to the same subject, like laboratory bills with the reports. This can be controlled by a smart metadata tagging within ECM application.

In accordance with an embodiment, the systems and methods described herein can additionally provide a mechanism by which it can be specified how new content items should be merged to an already existing content item in the ECM application. This can then allow for greater control. For example, the systems and methods can allow for control over whether a new content item should appear in first page, or if it should be appended to the end of the existing content item, or to allow the ability to specify a page number on which the new content item should appear within the pre-existing content item.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Figure 3:
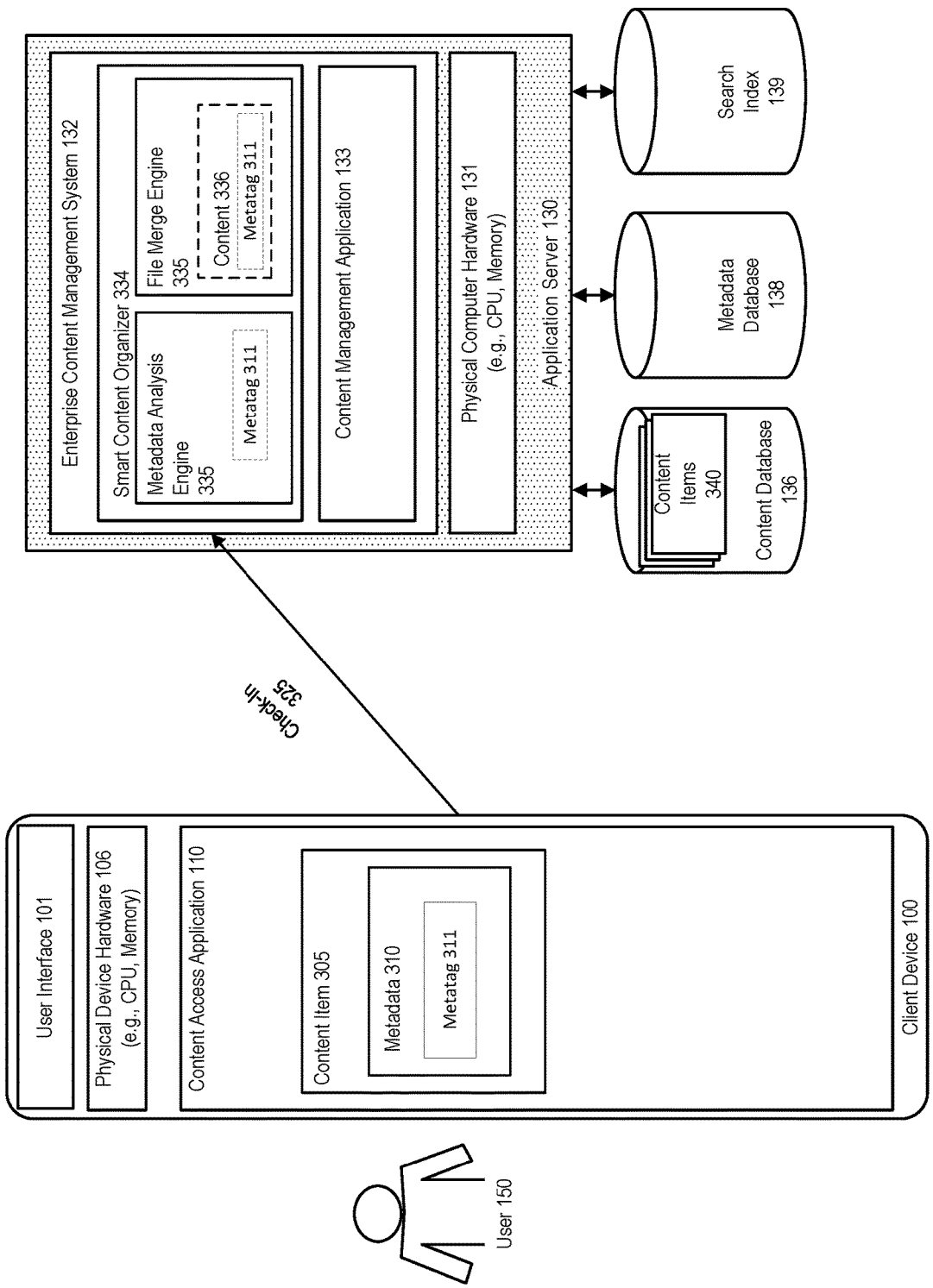
FIG. 3 illustrates a system for providing a correlated content organizing technique in a content management system, in accordance with an embodiment.

FIG. 3 illustrates a system for providing a correlated content organizing technique in a content management system, in accordance with an embodiment.

More specifically, FIG. 3 shows a system for the automatic merging of content items within a content management system. As illustrated in FIG. 3, in accordance with an embodiment, for a client device 100, having a user interface 101, and physical device hardware 106, (e.g., CPU, memory), the client device can be provided with a content access application 110 for execution thereon.

In accordance with an embodiment, the client device can be in communication with an application server 130 that includes a physical computer hardware 131 (e.g. CPU, memory) and an enterprise content management system 132, which can include a content management application 133 and a smart content organizer 334.

In accordance with an embodiment, the content access application at the client device can communicate with the enterprise content management system via a network. The content access application can be configured to enable a user 150 to view, upload, modify, delete, or otherwise access content such as data/files from the client device. For example, new content can be added or uploaded to the enterprise content management system by a user interacting with the content access application on an associated client device. The content can be transmitted to the enterprise content management system for storage.

In accordance with an embodiment, the enterprise content management system can be or can include a platform for consolidating content that can be managed by a plurality of users of an enterprise. In accordance with an embodiment, the enterprise content management system can be configured to communicate with a content database 136 for storing content (or content items), and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles.

In accordance with an embodiment, the enterprise content management system can be configured to associate metadata 311 with the content. Metadata can include information about an item of content, such as its title, author, release date, historical data such as who has accessed the item and when, a location where the content is stored, hierarchical structure of data, and the like.

In accordance with an embodiment, the metadata can be stored in a metadata database 138. In accordance with an embodiment, the enterprise content management system can be configured to communicate with the metadata database to access metadata stored therein, and to store metadata generated by the system in the metadata database.

In accordance with an embodiment a typical enterprise content management system can frequently perform check in 325 operations. In general, when a user executes an operation to a content item, such as content item 305, the user so signals such operation via a content access application 110.

In accordance with an embodiment, the systems and methods provided herein enable the ECM to automatically, via the smart content organizer 334, find related content items, e.g., within content items 340 in content database, by performing a metadata analysis via a metadata analysis engine 335 (e.g., search within the metadata database). Upon finding suitable existing content within the content database, the smart content organizer 334 can, via the file merge engine 335, merge the uploaded content item 305 with existing content items, such as content 336, which is pulled, or accessed, from the content database 136. Such merging can be in the form of appending one document to another, or in the form of creating or adding to a folio of existing content items.

In accordance with an embodiment, a comparison of metadata can be used by the smart content organizer in determining whether to merge two files via a merge operation (and such metadata can then additionally be used to determine an order in which the merged files should appear), or to gather the files into a digital folio that can then be stored at a content database.

In accordance with an embodiment, and as an illustrative example, suppose the content item 305 to be checked into the ECM system 132 comprises an electrocardiogram (EKG) of a patient identified. The patient, for example, can be associated with a metadata tag 311. This tag could include such information as the patient's name, address, phone number, medical record number, identification, primary physician . . . etc.

In accordance with an embodiment, content 336 can comprise the patient's medical record, which can be identified by metadata tag 311, which can comprise at least a portion of the patient's information as well. By comparing the metadata, and finding enough to make a match, the smart content organizer can merge the content item 305 with the existing content 336 to form either an appended document or content item, or a folio of content items.

Figure 4:
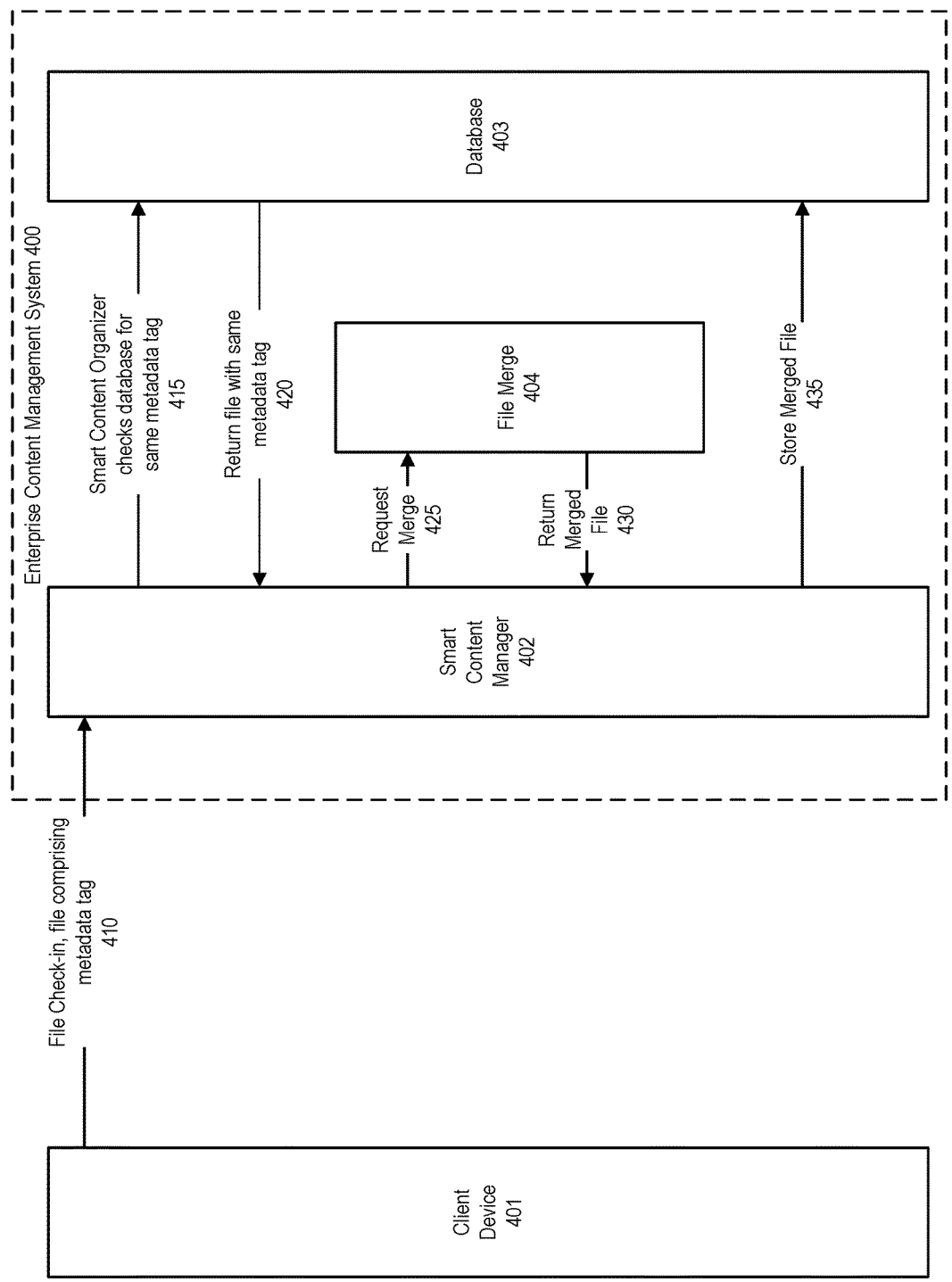
FIG. 4 illustrates a system for providing a correlated content organizing technique in a content management system, in accordance with an embodiment.

FIG. 4 is a flow chart of a method for file check in and merging in a merged file, in accordance with an embodiment.

In accordance with an embodiment, a request to check in a file 410 can be received from a client device 401 at an enterprise content management system 400. The file can be associated with a metadata tag.

In accordance with an embodiment, a smart content manager 402 can receive the file to be checked in, analyze the metadata tag associated with the checked-in file, and perform a search 415 in a database 403 to check for existing content items that match all, or at least a portion of the metadata tag of the checked in file.

In accordance with an embodiment, upon finding a file within the database 403 that matches all or at least a portion of the metadata tag, the matching file can be returned 420 to the smart content manager.

In accordance with an embodiment, the smart content manager 402 can request that the checked-in file as well as the file pulled from the database be merged 425, at a file merge 404. The file merge can, in some embodiments, be a part of the smart content manager. Alternatively, such merge operations can take place at the database.

In accordance with an embodiment, the smart content manager's request to merge the files can additionally comprise information about how the files are to be merged. Such information can include, but is not limited to, a file type for the output file, an order in which the files are to appear in the merged file, and a metadata tag to be associated with the merged file.

In accordance with an embodiment, the merged file 430 can be returned to the smart content manager 402.

In accordance with an embodiment, the smart content manager can then request that the merged file be stored 435 at the database 403.

Organizing Correlated Content Items into Folios in ECM

In accordance with an embodiment, in some circumstances, it may be desired to organize correlated and/or dependent content items under a single umbrella within the ECM application. However, at the same time, it might not be relevant to merge these content items into one single content item in an ECM application. In such situations, as well as others, folios (also referred to herein as "virtual structures" or "content folios") can be used.

In accordance with an embodiment, virtual structures (folios or content folios) can provide a quick and effective way to assemble, track, and access logical groupings of multiple content items within a content management system. For example, all items relevant to an upcoming brochure, such as images, logos, legal disclosures, and ad copy, can be assembled and sent through a workflow process. Once approved, all associated content can be downloaded and sent for print.

In accordance with an embodiment, as another example, virtual structures can be used when a new project requires a virtual place to assemble all relevant content items in a particular hierarchy, whenever they are checked in, with restricted access to particular areas of the hierarchy. Or a video may need to be associated and tracked with release waivers and narration text. All this can be done with content folios.

In accordance with an embodiment, a content folio or a virtual structure can comprise a file (e.g., a XML (extensible markup language) file) checked into a repository that uses elements to define a hierarchical structure of nodes, slots, and specified content items in the ECM. In practice, a content folio is a logical grouping, or a framework, in which content stored in the repository can be structured. Such folios or virtual structures can vary in complexity as well. Simple folios can comprise a flat container, while advanced folios can nest content in a hierarchy within folders. In an advanced folio, the hierarchy may be established prior to assembling content items, or it may be created during or subsequent to assembling the items.

In accordance with an embodiment, existing folios or virtual structures can have content added to them, or can be locked so that no changes can be made. Content items can be added to a simple folio by searching an associated repository, and to an advanced folio by checking new items into the repository or by searching for content that has previously been checked in, all through an interface. An advanced folio can additionally contain links to outside resources such as websites or shared network drives.

In accordance with an embodiment, for example, consider the above use-case, wherein a medical report of a patient needs to be maintained by a hospital. In such a situation, the patient would be visiting multiple laboratories to get different kinds of medical examinations done like, such as dental x-rays, ECG, MRI, CT scans, etc. In such situations, it may not be relevant for user, such as a dentist, to refer reports like ECG or the MRI for treating a dental condition. Similarly, sometimes certain lab reports can be very confidential, and should not be merged with other reports into one single content item. In such situations, all the correlated reports can still be placed under a single folio, where access to certain portions of the folio, such as confidential lab results, can be controlled via security access rights in ECM application.

In accordance with an embodiment, the systems and methods disclosed herein can allow for the identification of content items (e.g., laboratory reports) being newly uploaded to the ECM application belonging to particular subject (e.g., patient) and organize such content items (multiple laboratory reports) into a virtual structure within the ECM application, which can be referred to as a folio. Such folios can additionally be updated, for example, if a lab report is updated with a new analysis, the lab report in the folio can be likewise updated within the folio.

In accordance with an embodiment, for example, suppose a user that is a surgeon, has to search for a particular folio rather than individual content items (laboratory reports) and download all or some selected content items (laboratory reports) for reference, thus making the job of finding the content item (which is a collection of all the related information on a subject) very easy and in a shorter amount of time.

Figure 5:
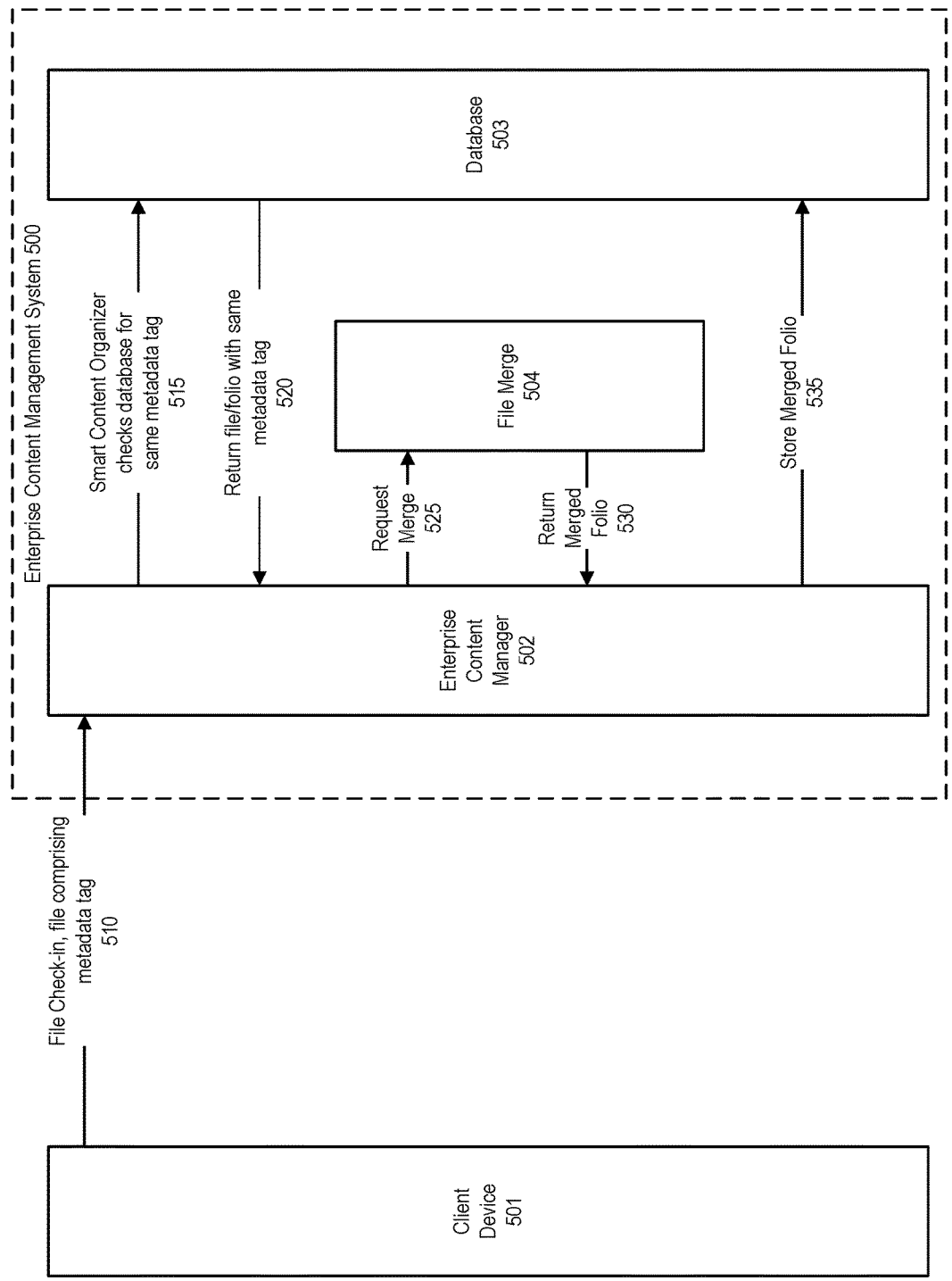
FIG. 5 shows a system for content organization by tracking and learning from user actions, in accordance with an embodiment.

FIG. 5 is a flow chart of a method for file check in and merging in a merged file, in accordance with an embodiment.

In accordance with an embodiment, a request to check in a file 510 can be received from a client device 501 at an enterprise content management system 500. The file can be associated with a metadata tag.

In accordance with an embodiment, a smart content manager 502 can receive the file to be checked in, analyze the metadata tag associated with the checked-in file, and perform a search 515 in a database 503 to check for existing content items that match all, or at least a portion of the metadata tag of the checked in file. Such items can comprise existing files or existing folios.

In accordance with an embodiment, upon finding a file or an existing folio within the database 503 that matches all or at least a portion of the metadata tag, the matching file/folio can be returned 520 to the smart content manager.

In accordance with an embodiment, the smart content manager 502 can request that the checked-in file as well as the file/folio pulled from the database be merged 525, at a file merge 504. The file merge can, in some embodiments, be a part of the smart content manager. Alternatively, such merge operations can take place at the database.

In accordance with an embodiment, the smart content manager's request to merge the files can comprise information about how the files are to be merged. In the use case depicted in FIG. 5, the files are to be merged into a folio by either creating new folio (e.g., in the situation where the returned file from the database was a pre-existing file and not a pre-existing folio), or adding the checked-in content item to an existing folio. In accordance with an embodiment, the folio can assign degrees of security to each content item within a folio separately. For example, such security features of the ECM system can ensure that various content items within folios can only be viewed by privileged users, while other content items within the folio have a lesser degree of security.

In accordance with an embodiment, the folio 530 can be returned to the smart content manager 502.

In accordance with an embodiment, the smart content manager can then request that the folio be stored 535 at the database 503.

Merge Operation for Legacy/Pre-Existing Content Items in ECM

In accordance with an embodiment, in a legacy ECM application (i.e., an ECM application that already contains a number of content items), there can be already large number of content items that are related to a particular subject but scattered throughout the ECM system. The systems and methods presented herein can additionally provide a mechanism of finding such related content items and performing a merge of all the related content items of a particular subject into a merged content item.

In accordance with an embodiment, such existing content items can be merged based upon an identification of the related content items based on metadata tagging. As well, during the merge, controlling capabilities can be provided, like which content item should be appearing in the first page, which content item should be appearing in the last page, and also providing specific page numbers for content items to appear in the final merged single content item.

In accordance with an embodiment, for example, such merge operations on legacy ECM applications can be thought of as a contact list on a smart phone. In such a situation, suggestions can be provided (or automatically performed) to merge contacts with same name (and/or e-mail IDs), but with different phone numbers and stored as separate individual contact items.

In accordance with an embodiment, the systems and methods can also provide an option to choose merging and/or organizing the correlated content items into virtual structure within the ECM application. The merge-agent can scan the legacy ECM application to find all the correlated and/or dependent content items and provide an option to organize such content items into folios.

Figure 6:
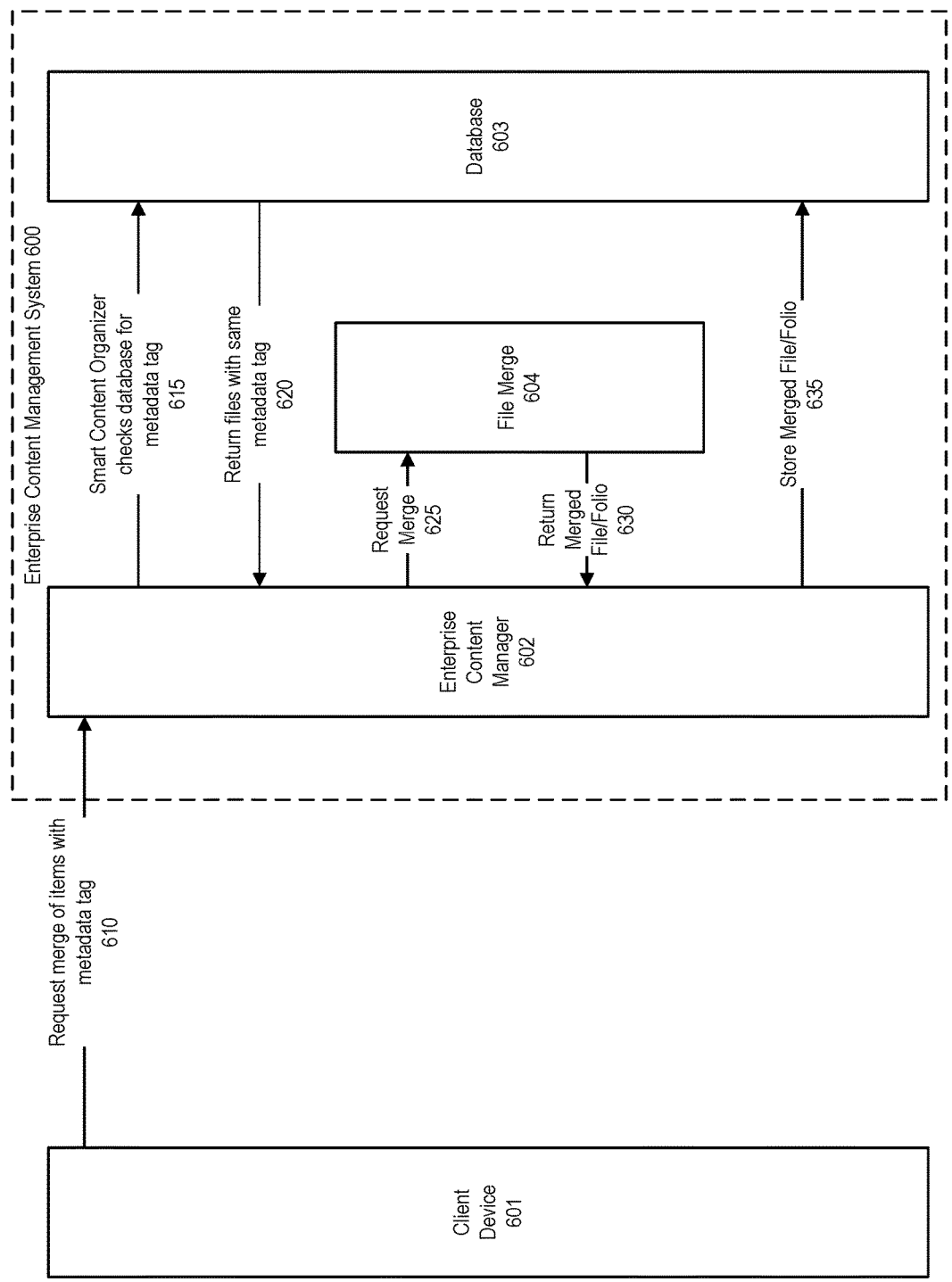
FIG. 6 shows a system for content organization by tracking and learning from user actions, in accordance with an embodiment.

FIG. 6 is a flow chart of a method for file merge in existing database structures, in accordance with an embodiment.

In accordance with an embodiment, a request to merge files 610 in an existing database 603 can be received can be received from a client device 601 at an enterprise content management system 600. The request can be associated with a metadata tag.

In accordance with an embodiment, a smart content manager 602 can receive the request merge existing files, analyze the metadata tag associated with the request, and perform a search 615 in a database 603 to check for existing content items that match all, or at least a portion of the metadata tag of the request. Such items can comprise existing files or existing folios.

In accordance with an embodiment, upon finding files or existing folios within the database 603 that matches all or at least a portion of the metadata tag, the matching files/folios can be returned 620 to the smart content manager.

In accordance with an embodiment, the smart content manager 602 can request that the located files/folios pulled from the database be merged 625, at a file merge 604. The file merge can, in some embodiments, be a part of the smart content manager. Alternatively, such merge operations can take place at the database.

In accordance with an embodiment, the smart content manager's request to merge the files can comprise information about how the files are to be merged. These are described above in the context of FIGS. 4 and 5. More particularly, the merge request 625 can specify that the located files/folios either be merged in an appended file, or merged into a new or existing folio.

In accordance with an embodiment, the merged file or folio 630 can be returned to the smart content manager 602.

In accordance with an embodiment, the smart content manager can then request that the merged file or folio be stored 635 at the database 603.

Use Case Examples

In accordance with an embodiment, the following use case example is provided for illustrative purposes. In a situation where a patient gets blood-test done at an Apollo Clinic and the test report is uploaded into a content management system. After six months, the patient gets the blood-test done again from an Apollo Clinic. When this subsequent test report is uploaded into the content management system, the system can pop-up the already uploaded report along with this new report side-by-side and provides options like "merge into single doc", "organize into folios", "keep items separately".

In accordance with an embodiment, the content management system can provided such options based upon a determined correlation between the related content items. The system can make such determination in a number of different ways. In an embodiment, when a content item is uploaded into the content management system, based on certain pre-configured metadata rules, the content management system can generate smart tag to group content items into different buckets. In the case above, the Apollo Clinic could have assigned every patient a unique ID which could then be used to identify the patient's profile with ease. The content management system could consider metadata fields like, "Patient ID", "Patient Name" and "Type of test" to generate a smart metadata tag and assign the test results the content item being uploaded. Then, when a new lab report is being uploaded, the same metadata fields can be considered for generating the smart metadata tag and pick the already existing content items from that particular bucket and present them side-by-side for ease of comparison and take necessary action.

In accordance with an embodiment, the following use case example is provided for illustrative purposes. In a situation where a bank sends a soft copy of monthly credit card statements to its customers. The content management system with smart content merging feature can allow the bank to present new credit card statements side-by-side with previous credit card statements. This can be done automatically, for example, when a latest credit card statement is uploaded into the ECM application. Here, metadata fields like "card number", "bank name" and "customer name" can be considered for generating the smart metadata tag to group content items into different buckets.

In accordance with an embodiment, the following use case example is provided for illustrative purposes. In a situation where a mobile network provider sends a soft copy of monthly invoice statements to its customers. The ECM system with smart content merging feature can be capable of presenting the invoice statements side-by-side for prior months when a user tries to upload latest invoice into a CMS (content management system) or a ECM. Again, metadata fields like "mobile number", "network provider name" and "customer name" can be considered for generating the smart metadata tag to group content items into different buckets.

Smart Metadata Tag Assignment

In accordance with an embodiment, metadata fields considered for smart tag generation can be configured automatically or by an administrator during the creation of folders or folios. Once the metadata fields are defined, the ECM system can generate smart tags based on the values populated for those metadata fields and assign these tags to each content item during upload/check-in into the ECM system, or during a scan of a legacy system.

In accordance with an embodiment, alternatively, instead of ECM system generating the tags, such tags can be assigned that can be considered for organizing into buckets during the upload/check-in of content items into the ECM system.

In accordance with an embodiment, as well, smart tags can be generated by analyzing the data in the uploaded documents/content items. ECM systems can perform full-text search and comprise content extraction mechanisms for extracting the data. By performing such text searches and data extraction, such data extracted can be used to analyze and determine the type of content item by, for example, processing the number of occurrences of a particular word, phrase, highlighted text, headings, taxonomy, etc. Then, smart tags can be generated by the ECM system by considering a number of possible combinations of such extracted data and assigning these tags to each content items during upload/check-in into the ECM system (or during a scan of a legacy ECM system).

In accordance with an embodiment, in general, as the number of metadata fields (or number of possible combinations) considered for smart tag generation increases, the better the tagging system can perform. For example, an ECM system can have content items/invoices related to multiple users. Assuming only the "mobile number" is considered for smart tagging of invoice bills: when a user ports his/her number from one network provider to another, the comparison of invoices of two different network provider might not provide relevant monthly usage data, since the usage would be dependent on offers and plan chosen. When a customer surrender's the "mobile number" and the same number is assigned to a different customer, the invoices of multiple customers might be pulled up for comparison and/or merge, which is again irrelevant and also a security breach. As such, the tagging system would perform better if more than just "mobile number" tag was used. For example, additional tags such as name, address could additionally be used to provide for a better degree of certainty.

In accordance with an embodiment, as another example, e-mail client applications can be capable of finding relevant documents and can display the previous and latest items side-by-side. In such situations, the convenience and ease at which users would be able to compare documents sent to e-mail accounts would be multi-fold with the implementation of the disclosed features.

In accordance with an embodiment, for example, consider, as soon as a credit card statement is sent to a customer's e-mail account, and when the customer opens that particular e-mail, the e-mail client application, via an ECM system, can pull up the previous 2 months credit card statements and place them side-by-side with the latest statement. This would then allow a user to analyze and compare the documents. The amount of time, resources and manual work saved from end-user perspective is directly proportional to the amount of time spent in finding old e-mails, downloading them on to the local machine and also downloading the latest statement on to the local machine and then opening up all the 3 credit card statements for comparison.

In accordance with an embodiment, an enterprise content management system can be provided. The enterprise content management can support operations such as Check-In, Checkout and Search of content item(s). These operations can be further extended to support smart content merging feature.

In accordance with an embodiment, the enterprise content management system's metadata set can be enhance. Custom metadata tagging can be provided to create grouping to identify the content items to relate and represent multiple content items as a single content item. The number of custom metadata set/tagging can be determined depending upon the digital eco-system.

In accordance with an embodiment, an auto-merge content agent can be provided and triggered during upload of content items into the enterprise content management system. This agent can be responsible to run deep scan on the smart metadata tagging to quickly identify the related content items corresponding to the item being uploaded to the enterprise content management system. Upon successfully identifying related content items, a user can optionally be provided with options to choose if the new content item should be appended to end, should be made the first page or should be inserted at any particular page number. Such decision can also be made automatically based upon a rules set. The auto-merge agent can run the merging mechanism within enterprise content management system to produce a final content item.

In accordance with an embodiment, the auto-merge content agent can be triggered based on already existing content items within the enterprise content management system to identify all the related content items depending upon the smart metadata tagging. Again upon successfully identifying the co-related content item, a user can optionally be provided with options to choose if the content items selected for merge meets User criteria and correspondingly User can choose which content item needs to be appended to end, should be made the first page or should be inserted at any particular page number. Such decision can also be made automatically based upon a rules set. The auto-merge agent can run the merging mechanism within enterprise content management system to produce a final content item.

Figure 7:
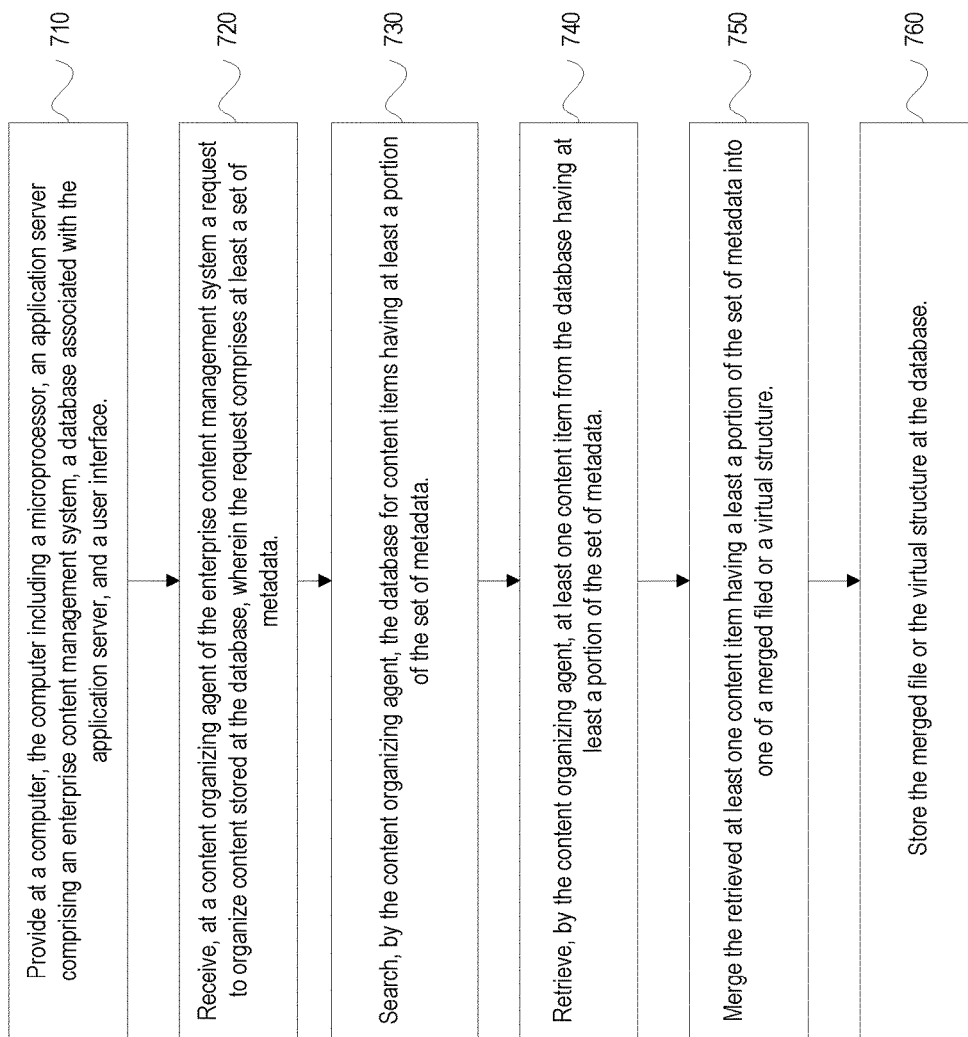
FIG. 7 is a flowchart of a method for providing a correlated content organizing technique in a content management system, in accordance with an embodiment.

FIG. 7 is a flowchart of a method for providing a correlated content organizing technique in a content management system, in accordance with an embodiment.

At step 710, in accordance with an embodiment, the method can provide at a computer, the computer including a microprocessor, an application server comprising an enterprise content management system, a database associated with the application server, and a user interface.

At step 720, in accordance with an embodiment, the method can receive, at a content organizing agent of the enterprise content management system a request to organize content stored at the database, wherein the request comprises at least a set of metadata.

At step 730, in accordance with an embodiment, the method can search, by the content organizing agent, the database for content items having at least a portion of the set of metadata.

At step 740, in accordance with an embodiment, the method can retrieve, by the content organizing agent, at least one content item from the database having at least a portion of the set of metadata.

At step 750, in accordance with an embodiment, the method can merge the retrieved at least one content item having a least a portion of the set of metadata into one of a merged filed or a virtual structure.

At step 760, in accordance with an embodiment, the method can store the merged file or the virtual structure at the database.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, mini-computers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application program code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A method for providing a correlated content organizing technique in a content management system, comprising:
   providing, at a computer, the computer including a microprocessor,
      an application server comprising an enterprise content management system,
      a database associated with the application server, the database comprising a content database and a metadata database, the metadata database storing metadata associated with content stored at the content database, and
      a user interface,
   receiving, at a content organizing agent of the enterprise content management system a request to organize content stored at the content database, wherein the request comprises at least a set of metadata;
   searching, by the content organizing agent, the metadata database to determine content items associated with at least a portion of the set of metadata;
   retrieving from the content database, by the content organizing agent, at least one content item from the database being associated with at least a portion of the set of metadata;
   upon retrieving the at least one content item, merging the retrieved at least one content item being associated with at least a portion of the set of metadata into one of a merged file or a virtual structure; and
   storing the merged file or the virtual structure at the content database.

2. The method of claim 1, further comprising:
   receiving, at the content organizing agent and in association with the received request, an uploaded file, wherein the set of metadata is associated with the uploaded file; and
   receiving, at the content organizing agent, an instruction to merge the uploaded file with the retrieved at least one content item being associated with at least a portion of the set of metadata into a merged file.

3. The method of claim 2,
   wherein the instruction to merge the uploaded file with the retrieved at least one content item being associated with a least a portion of the set of metadata into the merged file comprises an instruction regarding the order in which said uploaded file is to be merged with the content items being associated with at least a portion of the set of metadata within the merged file.

4. The method of claim 1, further comprising:
   receiving, at the content organizing agent and in association with the received request, an uploaded file, wherein the set of metadata is associated with the uploaded file; and
   receiving, at the content organizing agent, an instruction to merge the uploaded file with the retrieved at least one content item being associated with at least a portion of the set of metadata into a virtual structure.

5. The method of claim 4,
   wherein the retrieved at least one content item being associated with at least a portion of the set of metadata comprises a virtual structure.

6. The method of claim 5,
   wherein the instruction to merge the uploaded file with the retrieved at least one content item being associated with at least a portion of the set of metadata into the virtual structure comprises an instruction regarding an access security level for the uploaded file within the virtual structure.

7. The method of claim 6,
   wherein, after the merge, the virtual structure comprises a plurality of content items, wherein each of the plurality of content items is associated with an access security level of a plurality of access security levels.

8. A system for providing a correlated content organizing technique in a content management system, comprising:
   a computer comprising a microprocessor;
   an application server comprising an enterprise content management system;
   a database associated with the application server, the database comprising a content database and a metadata database, the metadata database storing metadata associated with content stored at the content database; and
   a user interface;
   wherein a request to organize content stored at the content database is received at a content organizing agent of the enterprise content management system, wherein the request comprises at least a set of metadata;
   wherein the content organizing agent searches the metadata database to determine content items being associated with at least a portion of the set of metadata;

wherein the content organizing agent retrieves, from the content database, at least one content item being associated with at least a portion of the set of metadata;

wherein, upon the at least one content item being retrieved, the retrieved at least one content item being associated with at least a portion of the set of metadata is merged into one of a merged file or a virtual structure; and wherein the merged file or the virtual structure is stored at the content database.

9. The system of claim 8, further comprising:

wherein an uploaded file is received at the content organizing agent and in association with the received request, wherein the set of metadata is associated with the uploaded file; and wherein an instruction is received at the content organizing agent to merge the uploaded file with the retrieved at least one content item being associated with at least a portion of the set of metadata into a merged file.

10. The system of claim 9, wherein the instruction to merge the uploaded file with the retrieved at least one content item being associated with at least a portion of the set of metadata into the merged file comprises an instruction regarding the order in which said uploaded file is to be merged with the content items being associated with at least a portion of the set of metadata with in the merged file.

11. The system of claim 8, further comprising:

wherein an uploaded file is received at the content organizing agent and in association with the received request, wherein the set of metadata is associated with the uploaded file; and wherein an instruction is received at the content organizing agent to merge the uploaded file with the retrieved at least one content item being associated with at least a portion of the set of metadata into a virtual structure.

12. The system of claim 11, wherein the retrieved at least one content item being associated with at least a portion of the set of metadata comprises a virtual structure.

13. The system of claim 12, wherein the instruction to merge the uploaded file with the retrieved at least one content item being associated with at least a portion of the set of metadata into the virtual structure comprises an instruction regarding an access security level for the uploaded file within the virtual structure.

14. The system of claim 13, wherein, after the merge, the virtual structure comprises a plurality of content items, wherein each of the plurality of content items is associated with an access security level of a plurality of access security levels.

15. A non-transitory computer readable storage medium having instructions thereon for providing a correlated content organizing technique in a content management system, which when read and executed by cause a computer to perform steps comprising:

providing, at a computer, the computer including a microprocessor, an application server comprising an enterprise content management system, a database associated with the application server, the database comprising a content database and a metadata database, the metadata database storing metadata associated with content stored at the content database, and a user interface, receiving, at a content organizing agent of the enterprise content management system a request to organize content stored at the content database, wherein the request comprises at least a set of metadata;

searching, by the content organizing agent, the metadata database to determine content items associated with at least a portion of the set of metadata;

retrieving from the content database, by the content organizing agent, at least one content item from the database being associated with at least a portion of the set of metadata;

upon retrieving the at least one content item, merging the retrieved at least one content item being associated with at least a portion of the set of metadata into one of a merged filed or a virtual structure; and storing the merged file or the virtual structure at the content database.

16. The non-transitory computer readable storage medium of claim 15, further comprising:

receiving, at the content organizing agent and in association with the received request, an uploaded file, wherein the set of metadata is associated with the uploaded file; and receiving, at the content organizing agent, an instruction to merge the uploaded file with the retrieved at least one content item being associated with at least a portion of the set of metadata into a merged file.

17. The non-transitory computer readable storage medium of claim 16, wherein the instruction to merge the uploaded file with the retrieved at least one content item being associated with at least a portion of the set of metadata into the merged file comprises an instruction regarding the order in which said uploaded file is to be merged with the content items being associated with at least a portion of the set of metadata within the merged file.

18. The non-transitory computer readable storage medium of claim 15, further comprising:

receiving, at the content organizing agent and in association with the received request, an uploaded file, wherein the set of metadata is associated with the uploaded file; and receiving, at the content organizing agent, an instruction to merge the uploaded file with the retrieved at least one content item being associated with at least a portion of the set of metadata into a virtual structure.

19. The non-transitory computer readable storage medium of claim 18, wherein the retrieved at least one content item being associated with at least a portion of the set of metadata comprises a virtual structure.

20. The non-transitory computer readable storage medium of claim 19, wherein the instruction to merge the uploaded file with the retrieved at least one content item being associated with at least a portion of the set of metadata into the virtual structure comprises an instruction regarding an access security level for the uploaded file within the virtual structure;

wherein, after the merge, the virtual structure comprises a plurality of content items, wherein each of the plurality of content items is associated with an access security level of a plurality of access security levels.

* * * * *

UNITED STATES PATENT AND TRADEMARK OFFICE
CERTIFICATE OF CORRECTION

PATENT NO. : 11,334,534 B2
APPLICATION NO. : 16/586380
DATED : May 17, 2022
INVENTOR(S) : Arasachetty et al.

It is certified that error appears in the above-identified patent and that said Letters Patent is hereby corrected as shown below:

In the Specification

In Column 1, Line 43, delete "intensive" and insert -- intensive. --, therefor.

In Column 14, Line 29, delete "(laaS)." and insert -- (IaaS). --, therefor.

In Column 14, Line 35, delete "laaS" and insert -- IaaS --, therefor.

In the Claims

In Column 16, Line 20, in Claim 3, delete "a least" and insert -- at least --, therefor.

In Column 17, Line 27, in Claim 10, delete "with in" and insert -- within --, therefor.

In Column 18, Line 16, in Claim 15, delete "filed" and insert -- file --, therefor.

Signed and Sealed this
Eighth Day of November, 2022

Katherine Kelly Vidal
*Director of the United States Patent and Trademark Office*